United States Patent
Padgett et al.

[19]

[11] Patent Number: 6,167,518
[45] Date of Patent: Dec. 26, 2000

[54] DIGITAL SIGNATURE PROVIDING NON-REPUDIATION BASED ON BIOLOGICAL INDICIA

[75] Inventors: Robert D. Padgett, Burke, Va.; John C. Maxwell, III, Wilton, Conn.

[73] Assignee: Commercial Electronics, LLC, New York, N.Y.

[21] Appl. No.: 09/123,793

[22] Filed: Jul. 28, 1998

[51] Int. Cl.[7] .............................. H04L 9/32; H04L 9/00; G06F 12/14

[52] U.S. Cl. .................. 713/186; 713/173; 713/176; 713/185; 713/202; 380/285

[58] Field of Search .................. 713/202, 156, 713/158, 159, 172, 173, 176; 380/4, 23, 25, 30, 285, 155

[56] References Cited

U.S. PATENT DOCUMENTS

| | | | |
|---|---|---|---|
| 5,208,858 | 5/1993 | Vollert et al. | 380/43 |
| 5,355,411 | 10/1994 | MacDonald | 380/23 |
| 5,386,104 | 1/1995 | Sime | 235/379 |
| 5,790,668 | 8/1998 | Tomko | 380/25 |
| 5,872,848 | 2/1999 | Romney et al. | 380/25 |
| 5,903,882 | 5/1999 | Asay et al. | 705/44 |
| 5,917,913 | 6/1999 | Wang | 380/25 |

OTHER PUBLICATIONS

Meyer, Carl H., and Matyas, Stephen M., *Cryptography*. Chapter 9, pp. 386–427, John Wiley & Sons, 1982.

*Primary Examiner*—Tod R. Swann
*Assistant Examiner*—Justin T. Darrow
*Attorney, Agent, or Firm*—Orrick, Herrington & Sutcliffe LLP

[57] ABSTRACT

A digital certificate is formed from a digitized representation of a unique biological feature of a registrant, for example, the registrant's chromosomal DNA. The digital representation is signed with the registrant's private encryption key and transmitted to a certificate authority. The registrant's identity is verified at a remote registration terminal. When the registrant's identity has been verified the certificate authority forms the certificate by encrypting the digital signature with the certificate authority's own encrypting key. The certificate is also held in a publicly available directory. The certificate is used to authenticate an electronic document by appending the certificate to the electronic document. The document and the certificate are then transmitted to a receiving terminal. The identity of the transmitting party can be verified by inspecting the certificate. In the event the sending party denies sending the document, the biological feature can be extracted from the certificate and directly compared with the actual biological feature of the sending party.

13 Claims, 9 Drawing Sheets

DIGITAL SIGNATURE PROVIDING NON-REPUDIATION BASED ON BIOLOGICAL INDICIA

FIELD OF THE INVENTION

The present invention relates generally to the field of authentication of electronic documents, and more particularly to a non-reputable digital signature that allows authentication of the identity of the sender of a message by comparison with the sender's unique biological indicia.

BACKGROUND

Electronic commerce is rapidly becoming a ubiquitous means of conducting business. The growing popularity of the Internet and World Wide Web has opened new avenues for the conduct of business. Execution of complicated business transactions electronically present a number legal and financial problems.

Security of electronic transactions is an area of concern because messages transmitted across public networks can be intercepted. A number of encryption methods have been developed which allow a message to be read only by the designated receiver. Using so-called public key encryption, party A sending a message to party B first encrypts the message using B's public key. B's public key can be freely distributed to anyone B wishes to communicate with. Only B's private key can decrypt the message. B keeps his private key secret and uses it to decode the message. If the message is intercepted it cannot be decoded without B's private key.

The identity of a party transmitting a message executing an electronic transaction is also of concern, particularly where one of the parties is obliged to perform in the future or is subject to some future liability. In such transactions it is necessary that the parties not be able to repudiate the agreement. Also, the identity of the parties must be clearly established so that each can be assured that the other party is in fact the person it represents to be, and is able to perform. Further, the identity of the parties may need to be established with a high degree of certainty to support a legal claim, should one of the parties later attempt to avoid or repudiate the transaction.

Digital signatures have been developed to provide a means for identifying a party transmitting an electronic message. One method for creating digital signatures is to generate public and private key pairs for each of a group of parties that may wish to exchange digitally signed documents. Each of the parties stores its public decrypting keys in a registry along with identifying information, such as the key owner's name and e-mail address. The key owners each keep their private encrypting keys secret.

To create a digital signature a party encrypts a message with his private encrypting key that includes the same identifying information that is stored in the registry. The party receiving the encrypted message goes to the registry and retrieves the sending party's public decrypting key and identifying information. The receiving party decrypts the message using the decrypting key from the registry and extracts the identifying information. If the identifying information found in the message matches the information stored in the registry then the receiving party concludes that the message is genuine. Further, there is some assurance that the sending party will not deny that he sent the message since only the sending party's private encrypting key can create a message that the sending party's public decrypting key can decode. A discussion of known digital signature techniques may be found, for example, in Meyer, Carl H. and Matyas, Stephen M., *Cryptography*, Chapter 9, pp. 386–427, John Wiley & Sons, 1982.

Known digital signature techniques suffer from certain problems. A third party may intercept a signed message and use the signed message to spoof another party. By retransmitting the signed message, the interceptor may be able to convince a recipient that he is the true sender. This is the so-called "man-in-the-middle" attack.

In addition, known digital signatures are subject to repudiation. A party may no longer wish to be bound by a disadvantageous agreement or may be subject to criminal or civil liability if he made the agreement. That party may simply deny sending a particular message. The party may claim that he did not intend to execute a transaction with a particular party but was instead the victim of a man-in-the-middle attack.

With known digital signature techniques, the only information connecting the sender with the message is the database entry in the registry containing his public decrypting key and the identifying information. Thus, the sender may repudiate a transaction by claiming that his public decrypting key was registered without his authority.

SUMMARY OF THE INVENTION

The present invention is directed to methods and apparatus for forming a digital certificate that provides positive user authentication and non-repudiation. It is an object of the present invention to provide a digital certificate for authenticating electronically transmitted documents which incorporates a unique characteristic of the sender, such as biological indicia that can only have come from the sender himself.

Another object of the present invention is to provide a digital certificate that allows positive identification of the sender which cannot be repudiated.

Yet another object of the present invention is to provide for encrypting an electronic message using a digital certificate based on biological indicia.

Yet another object of the present invention is to provide a method for positively identifying the sender of an electronic message signed with a biologically-based digital certificate.

Broadly, the present invention is directed to methods and apparatus for creating a digital certificate for use in electronic commerce which is based on biological indicia of the person providing the digital certificate such that the digital certificate provides positive identification of the sender and minimizes the ability of the sender to repudiate the authenticity of the certificate and any transaction embodied in an electronic document appended to the certificate.

According to a first aspect of the present invention there is provided a user terminal, a certificate authority, and a remote registration terminal. A person, hereinafter called a registrant, wishing to obtain a digital certificate enters a data corresponding to a biological or physical characteristic of himself, for example, his chromosomal DNA, into a terminal. Preferably, the data is entered in digital form, but could be entered by optical imaging (e.g. a photograph or a scanned fingerprint, iris, or retina) which is then processed into digital form. The digital representation of the registrant's biological indicia is encrypted using the registrant's private key and sent to the certificate authority along with the registrant's public key. The certificate authority decrypts the digital representation and stores it. The registrant then visits a remote registration terminal in person with the digital representation and other identifying documents. The operator of the remote registration terminal verifies the identity of the registrant from the identifying documents and transmits the digitized representation to the certificate authority. The certificate authority compares the decrypted digital representation with the representation sent from the remote registration terminal. If a match is found, the certificate authority forms a certificate by signing the digital signature using the certificate authority's encrypting key. The certificate is stored in a database and is sent to the registrant. Preferably, the database is public with no restriction as to who may access the stored certificate data. Alternatively, access to the database may be restricted to, for example, employees of a particular corporation or government department, database subscribers, or members of a stock exchange.

According to another aspect of the present invention, the registrant transmits a digital message including the certificate described above. The digital message is then encrypted with the registrant's private encrypting key. The party receiving the encrypted message decrypts the message using the registrant's public decrypting key. The receiving party inspects the message to verify that the appended certificate is valid and that the certificate was prepared by a reputable certificate authority by comparing the certificate with the information stored in the database. The reputation of the certificate authority provides some assurance that the message is genuine and that the sender will not later repudiate the message because his signature and identifying information are part of the certificate stored in the public database.

If additional assurance that the registrant actually transmitted the message is desired, the receiving party can transmit the certificate to the certificate authority and request that the certificate be decrypted to extract the digitized representation. The digital representation is then compared with the digital representation originally submitted by the registrant. If even greater assurance is required, for example, where the registrant later attempts to repudiate the message, the digital representation can be compared with biological indicia of the registrant from which the digital signature was originally formed.

BRIEF DESCRIPTION OF THE DRAWINGS

Further characteristics, features, and advantages of the present invention will be apparent upon consideration of the following detailed description of the present invention, taken in conjunction with the following drawings, in which like reference characters refer to like parts, and in which.

DETAILED DESCRIPTION

With reference to FIGS. 1–5, a process for forming a digital certificate according to a first embodiment of the present invention will be described. A person wishing to obtain a certificate, hereinafter called the registrant, first visits a service provider to obtain a digitized representation of a biological characteristic of his or her body. This digitized characteristic will be referred to as a bio-blob. A bio-blob may be formed from, for example, a digitized image of the registrant's fingerprint, iris or retina or a digital representation of a marker plate prepared from the registrant's chromosomal DNA. Other physical characteristics may be used, depending on the degree of security desired. For example, an image of the registrant's footprint, handprint, dental x-ray or other distinguishing characteristic of the registrant's body may be used. The bio-blob may also be a combination of digitized images and other identifying indicia of the registrant and may include, for example, a password such as an alphanumeric string. The service provider may be a medical clinic equipped to handle and analyze biological samples.

The service provider gives the registrant the bio-blob in digital form. The bio-blob may be provided on any of a number of digital media including a magnetic tape or disk, an optical disk, or a digital memory. A preferred medium for storing the bio-blob is a non-volatile solid-state memory incorporated in a so-called smart card for convenience and portability.

Note that in the figures "cylinders" illustrate data elements and "boxes" illustrate process functions. The data elements may be stored, for example, on magnetic or optical disk drives or in solid state memory devices. The process functions may be implemented by a general-purpose computer, for example, a personal computer, workstation, or mainframe computer, under the control of a software program. The functions described herein may also be performed by special purpose computing devices designed to perform specific data processing tasks, or by a combination of general purpose and special purpose processors.

Figure 1:
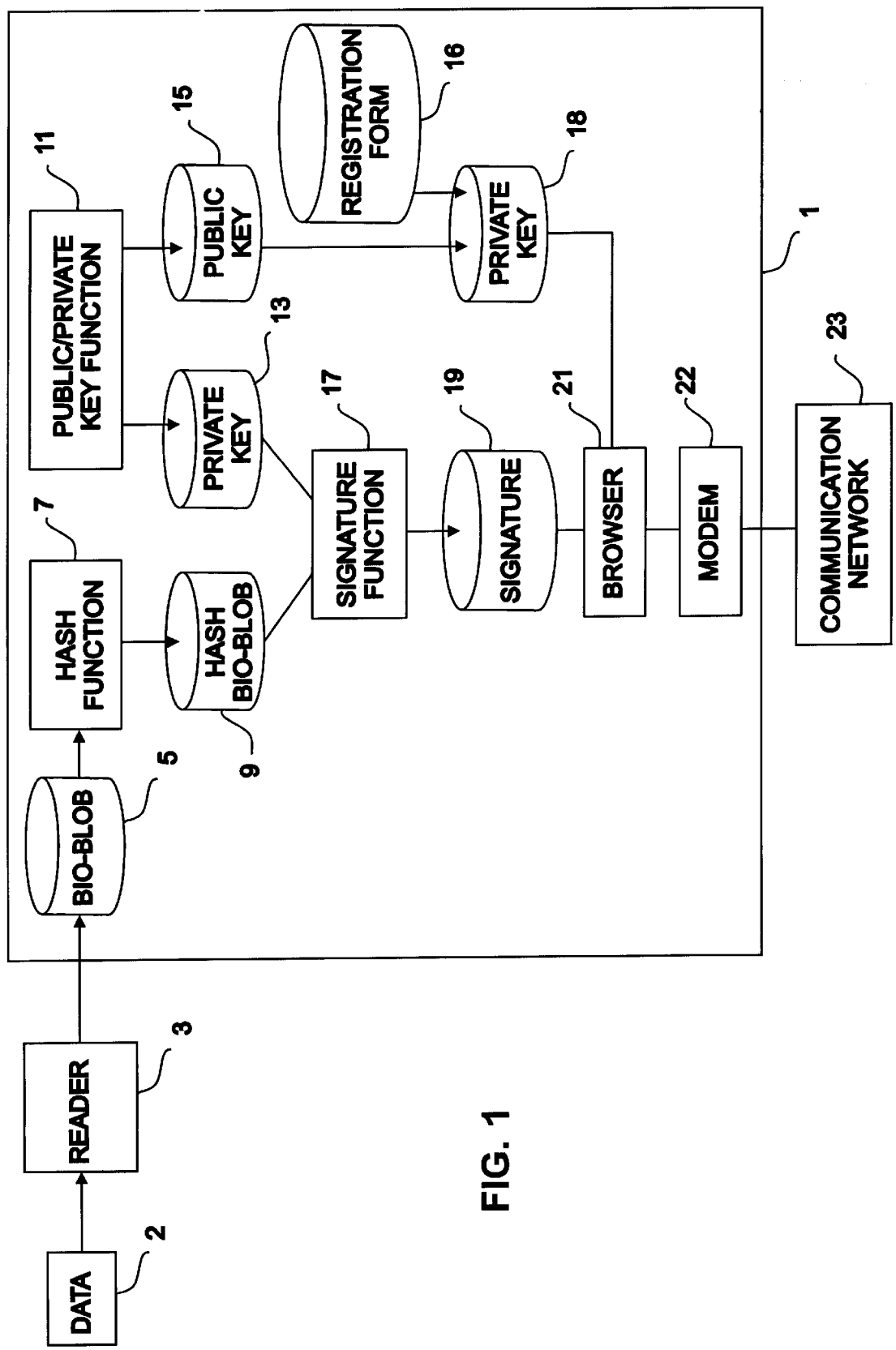
FIG. 1 is a block diagram of a terminal used for forming a digital certificate according to a first embodiment of the present invention.

FIG. 1 shows a terminal 1 owned by or associated with the registrant. Alternatively, the terminal 1 may be a device owned by a third party which is provided for the registrant's exclusive use in a manner explained below. The terminal 1 may be, for example, a computer workstation. The terminal 1 is connected with a reader 3. A data 2 containing the bio-blob 5 produced by the service provider is inserted into the reader 3 and the bio-blob data 5 is transferred to the terminal 1. The data 2 is preferably a smart card and the reader 3 is preferably a smart card reader, each of which is conventional in design and use.

A hash function 7 receives the bio-blob data 5 and calculates a hashed bio-blob 9. The hashed bio-blob 9 is a fixed length string which is a compressed version of the original bio-blob data 5. The hash function 7 is selected so that the bio-blob 5 is efficiently converted to the hashed bio-blob 9, but it is infeasible to generate a bio-blob that hashes to a given value. If the integrity of the hashed bio-blob 9 is violated, because of transmission errors or intentional manipulation, a receiving device can detect the violation using known error detection techniques.

A public/private key function 11 calculates a private 13 and public 15 key pair for the registrant. The key pair 13, 15 is designed to function with a so-called public-key algorithm. Messages encrypted with the private key 13 may be decrypted with the public key 15. However, knowledge of the public key 15 does not allow efficient calculation of the private key 13. For example, the key pair 13, 15 may be generated to work in the so-called RSA algorithm.

The hashed bio-blob 9 and the private key 13 are received by the signature function 17. The signature function 17 signs the hashed bio-blob 9 by encrypting it with the private key 13 to generate the signature 19. The registrant enters identifying information into a registration form 16. The registration form 16 is an electronic document which queries the registrant for identifying information such as the registrant's name, social security number, mother's maiden name, address, and telephone number. The registration form 16 may be a so-called Hypertext Mark-up Language (HTML) page.

Figure 2:
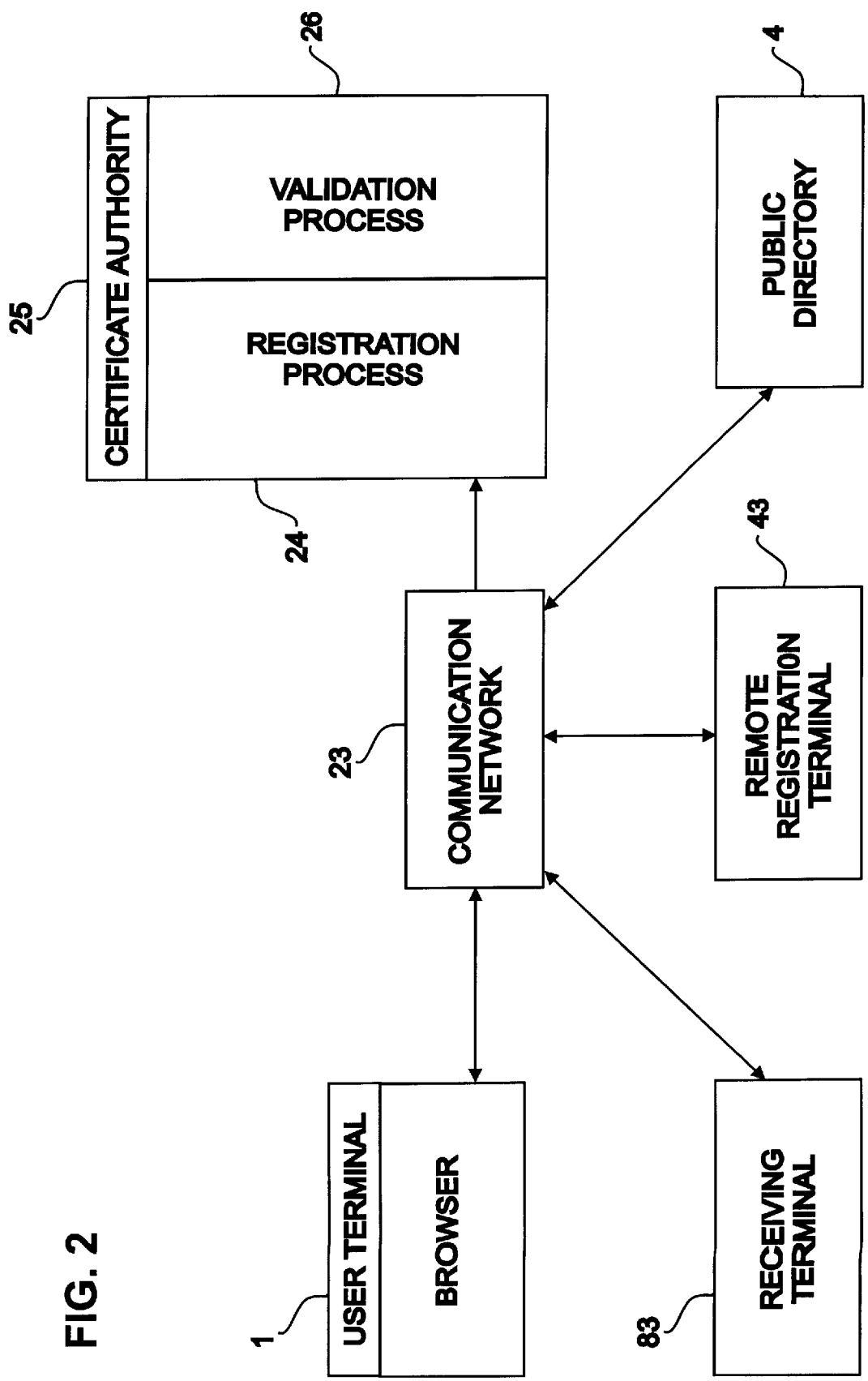
FIG. 2 is a block diagram showing components connected by a communication network for forming a digital certificate according to the first embodiment.

The public key 15 is combined with the registration form 16 to create a message 18. The message 18 and the signature 19 are formatted by the browser function 21 for transmission across a communication network 23 via a modem 22. The modem 22 formats the transmitted signal in a form which is compatible with the communication network. The communication network 23 may be, for example, an intranet, an internet or an extranet. The communication network 23 may be implemented, for example, using a public data network (PDN) or a private communication link, such as wide area network, a local area network, or a dedicated telephone line. The communication network 23 allows communication between and among the terminal 1, a public directory 4, a certificate authority 25, a registration manager 43, and a receiving terminal 83. The certificate authority 25 includes a registration process 24 and a validation process 26. FIG. 2 shows the registrant's terminal 1 connected with the communication network 23.

Figure 3:
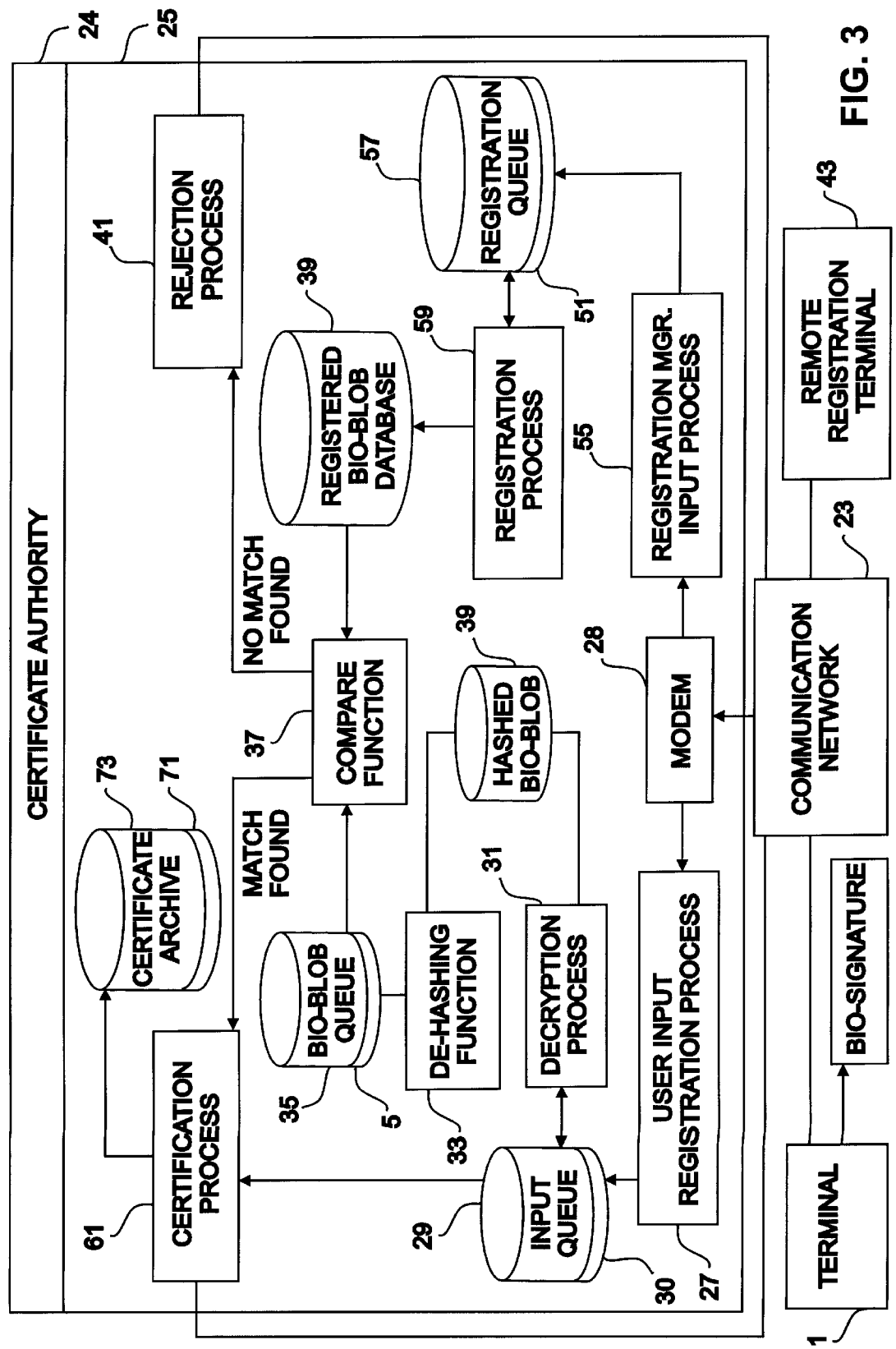
FIG. 3 is a block diagram showing the components of a registration process of a certificate authority used for forming a digital certificate according to the first embodiment.

The message 18 and signature 19 are transmitted from the terminal 1 to the certificate authority 25. FIG. 3 shows the registration process 24 of the certificate authority 25 in detail. Digital signals are received from the communication network 23 by the modem 28 which sends the message 18 and signature 19 to the user input registration process 27. The user input registration process 27 parses the message 18 and signature 19 from the communication network 23. The public key 15, registration form 16, and signature 19 are stored in the input queue 29. The decryption process 31 retrieves the signature 19 and public key 15 from the input queue 29. The decryption process 31 decrypts the signature 19 using the public key 15 to recover the hashed bio-blob 9. The hashed bio-blob 9 is then de-hashed by the de-hashing function 33 to recover the bio-blob 5. The bio-blob 5 is stored as a flat file in the bio-blob queue 35.

The compare function 37 retrieves the bio-blob 5 from the bio-blob queue 35 and compares it with bio-blobs stored in the registered bio-blob database 39. The registered bio-blob database 39 contains bio-blobs from persons who have completed the registration process, as will be described later. Because the registrant has not yet completed the registration process, no match will be found by the compare function 37. The compare function 37 sends a command to the rejection process 41 which sends a message to the terminal 1 via the communication network 23 instructing the registrant to complete the registration process. The bio-blob 5 remains in the bio-blob queue 35.

The registrant goes to a remote registration terminal 43 with the smart card 2 containing the digitized bio-blob 5 and physical identification which confirm the information entered in the registration form 16. The physical identification may be, for example, the registrants driver's license, passport, or other government-issued identification card. Preferably, the physical identification includes a photograph of the registrant. The remote registration terminal 43 is located at a service provider and the registrant must be physically present to be registered. An operator at the remote registration terminal 43 enters identifying information from the physical identification into a verification form 18. The verification form 18 may be an HTML page which queries the operator of the remote registration terminal for the same information requested by the registration form 16.

Figure 4:
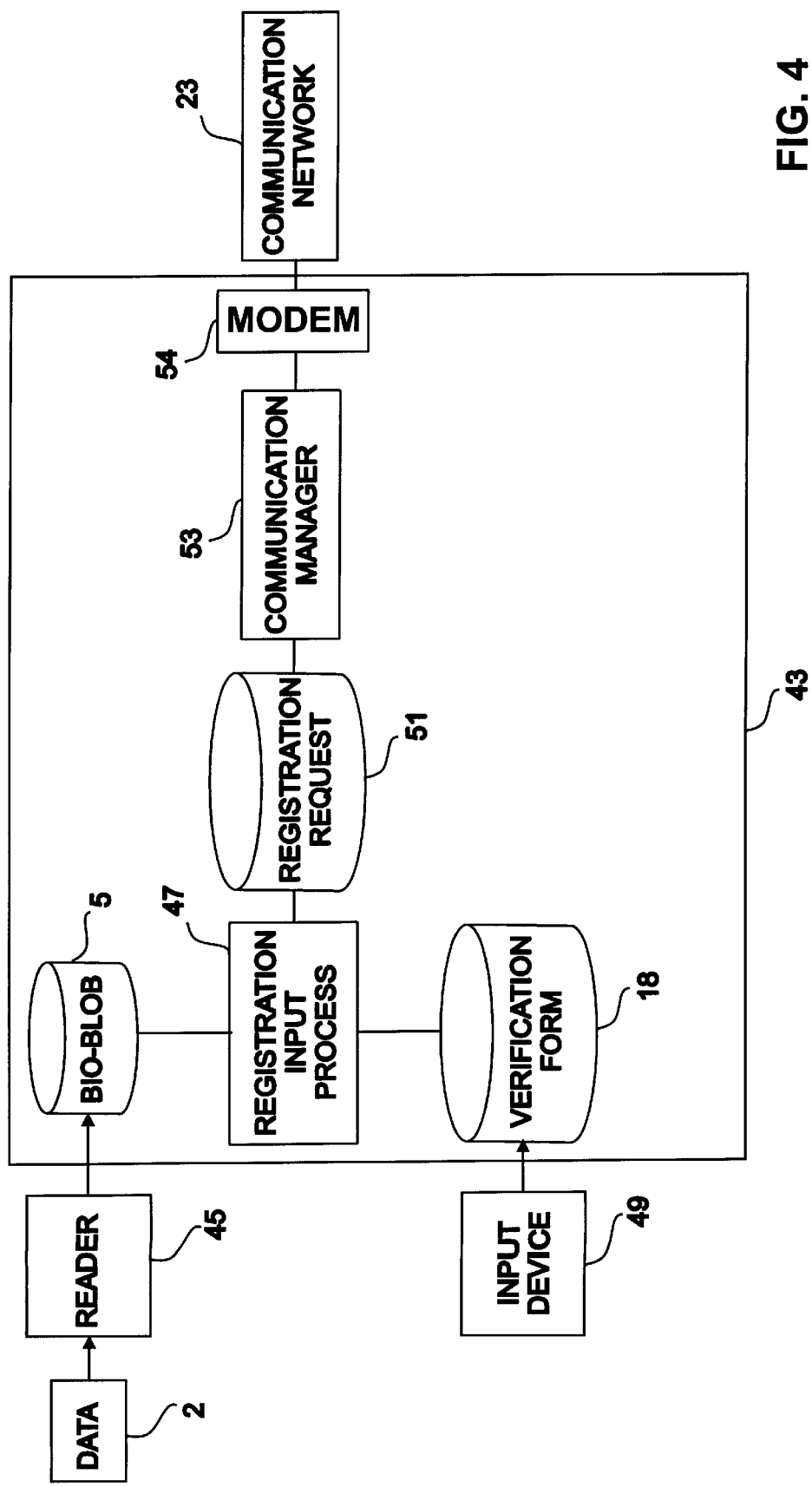
FIG. 4 is a block diagram showing a remote registration terminal for forming a digital certificate according to the first embodiment.

FIG. 4 shows the remote registration terminal 43 in detail. The bio-blob 5 stored on the smart card 2 is read by a reader 45 and sent to the registration input process 47. The operator enters information to the verification form 18 using an input device 49. The input device 49 may be a keyboard or a pointing device coupled to a graphical user interface. The registration input process 47 combines the bio-blob 5 with the verification form 18 to generate a registration request 51. The registration request 51 is formatted by the communication manager 53, transmitted by the modem 54 and sent to the registration process 24 of the certificate authority 25 across the communication network 23.

Referring again to FIG. 3, modem 28 receives the registration request 51 and sends it to the registration manager input process 55. The registration request 51 is stored in the registration queue 57. The registration process 59 retrieves the registration request 51 from the registration queue 57 and extracts the bio-blob 5. The bio-blob 5 is stored in the registered bio-blob database 39 along with the verification form 18.

The compare function 37 compares each newly registered bio-blob in the registered bio-blob database 39 with the bio-blobs stored in the bio-blob queue 35. When the registrant's bio-blob is found in both the bio-blob queue 35 and registered bio-blob database 39, the compare function 37 sends a message to the certification process 61 indicating that a match has been found. The compare function 37 also compares the registration form 16 with the verification form 18 submitted from the remote registration terminal 43 to verify the identity of the registrant.

Figure 5:
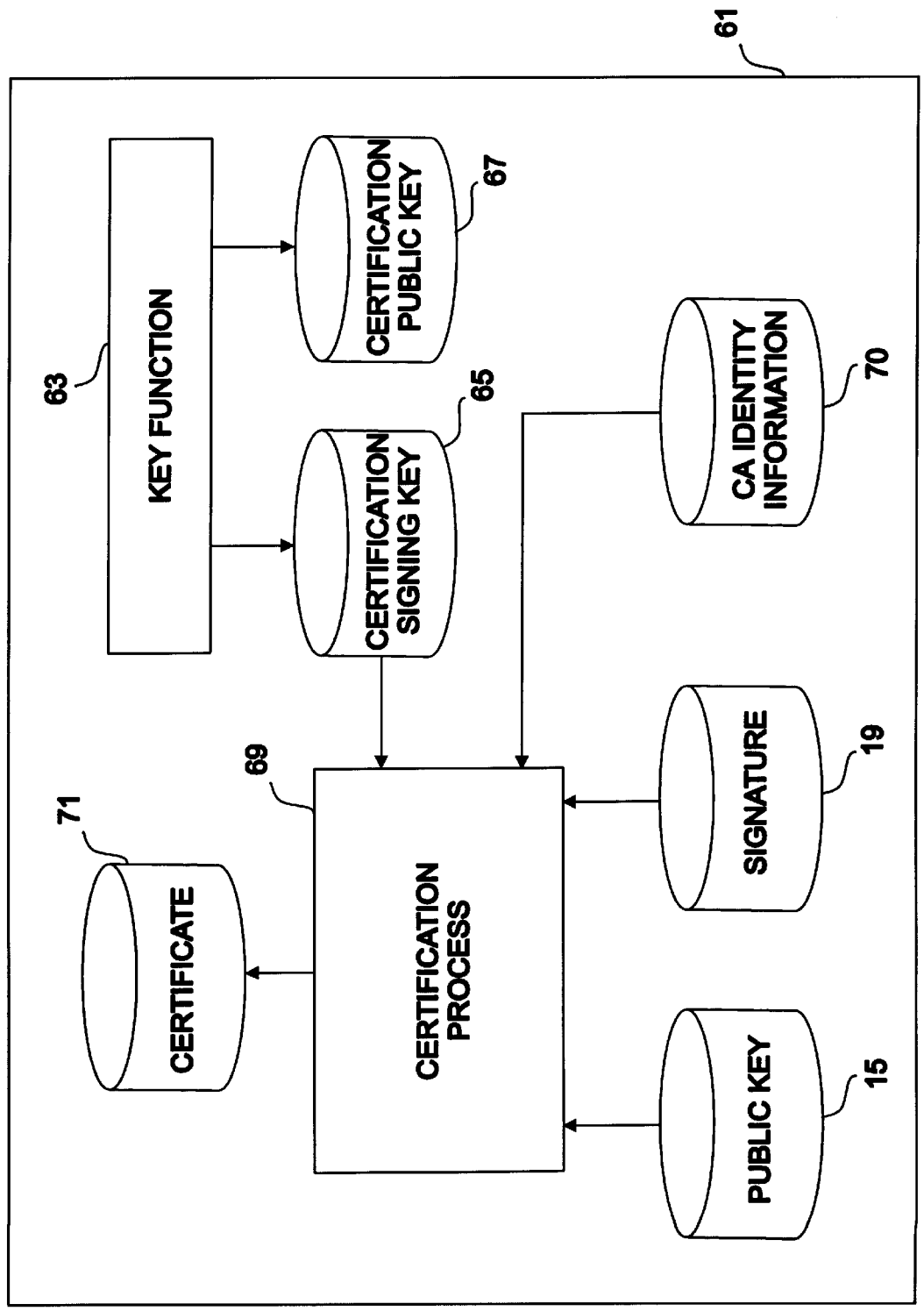
FIG. 5 is a block diagram showing the certification process of the certificate authority for forming a certificate according to the first embodiment.

The certification process 61 is shown in detail in FIG. 5. When a message is received from the compare function 37 indicating a match between the bio-blob queue 35 and the registered bio-blob database 39, the registration form 16, public key 15, and signature 19 are retrieved from the input queue 29. A key function 63 generates a certificate signing key 65 and a certificate public key 67. The certification process 69 encrypts the signature 19 using the certificate authority's signing key 65. The encryption process 69 appends certificate authority identity information 70 to the encrypted signature 19. The identity information 70 may be contained on an HTML page capable of supporting active links across the communication network 23. The encrypted signature 19 and identity information 70 form the certificate 71. The certificate 71 is sent to the registrant's terminal 1 via the communication network 23. The certificate 71 is also stored in certificate archive 73 along with the certificate authority's public key 67.

The certificate 71 is sent to a public directory 4 via the communication network 23. According to a preferred embodiment, any terminal connected to the communication network 23 may read the public directory 4. Alternatively, access to the directory 4 may be limited to certain authorized persons. The public directory 4 contains all the valid certificates for each registrant on the communication network 23. The public directory 4 also contains a list of certificates that are no longer valid. Parties can compare certificates received with electronic documents against the certificates stored in the public directory 4 via the communication network 23 to determine if a document includes a valid certificate. The identity information 70 in each certificate may include an active link to the public directory 4 allowing a party to access the valid certificates and list of invalid certificates conveniently.

There is an advantage in having the digital signature 19 prepared at the registrant's terminal 1 and then having the registrant register in person at the remote registration terminal 43 using his bio-blob 5. The registrant maintains control over the key pair 13, 15, as well as his bio-blob 5 stored on the smart card 2, which were used to prepare the signature 19 that forms the basis for the certificate 71. The registrant cannot later claim that a certificate 71 was prepared without his authorization.

If the key pair 13, 15 or the smart card 2 are disclosed to others, the registrant must inform the public directory 4 to add the certificate 71 to the list of invalid certificates. A new certificate will have to be prepared. If another party receives an electronic document signed using the now invalid certificate, that party will know that the document cannot be relied upon.

Figure 6:
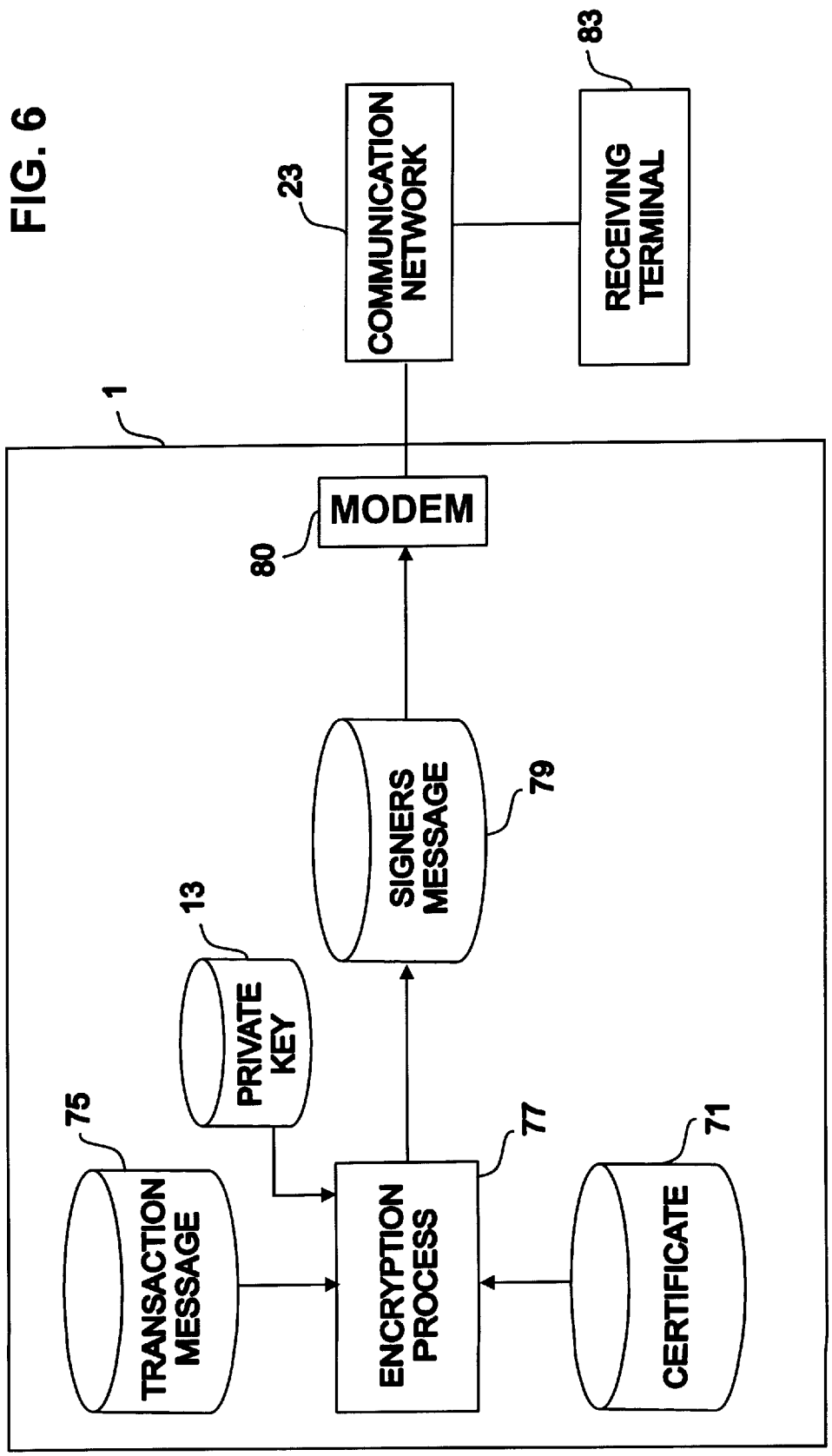
FIG. 6 is a block diagram showing a terminal used for signing an electronic message with a digital certificate according to a second embodiment of the present invention.
Figure 7:
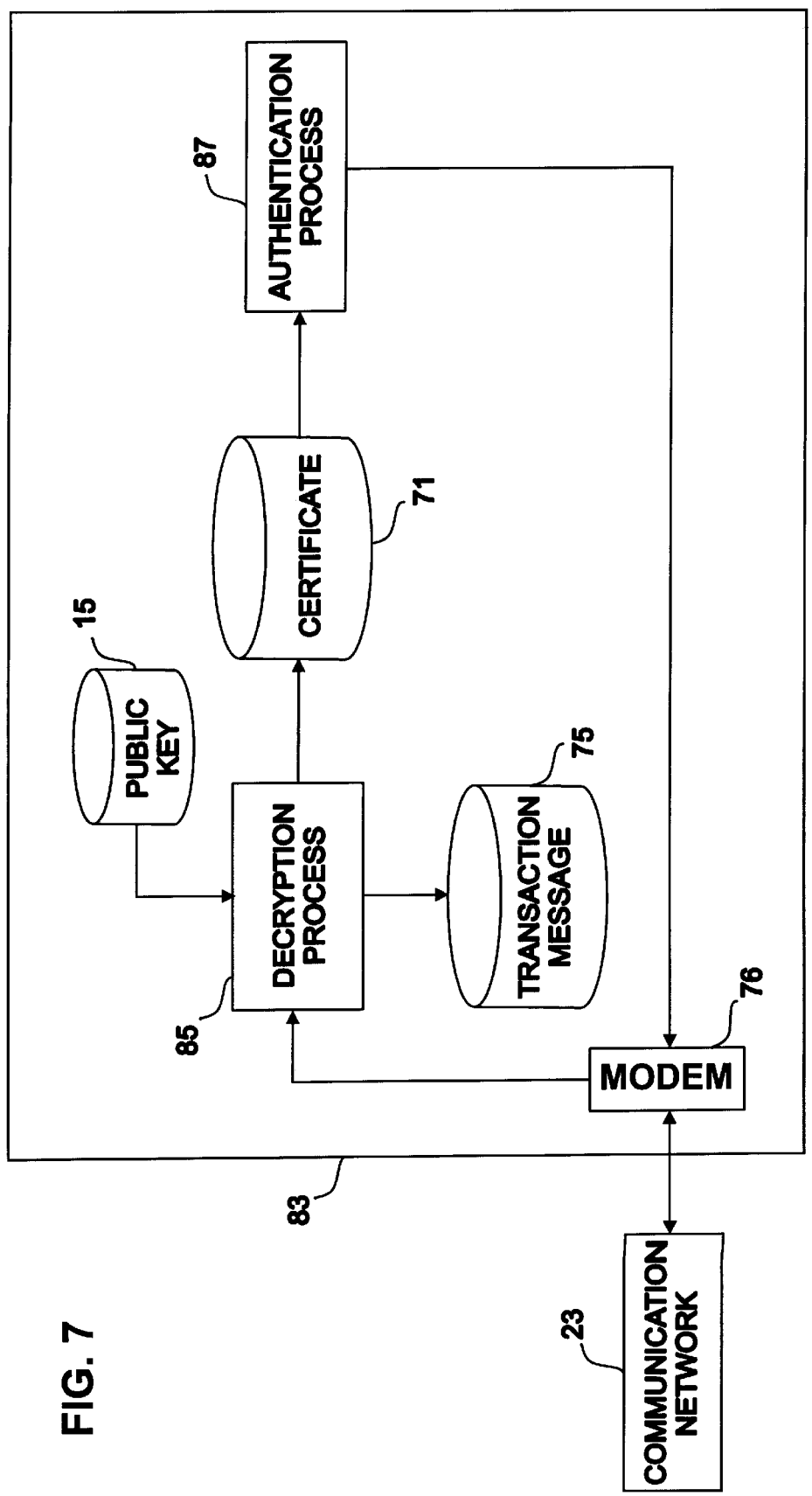
FIG. 7 is a block diagram showing a portion of a terminal for receiving and authenticating the electronic message signed with the digital certificate by the apparatus of FIG. 6 according to the second embodiment.
Figure 8:
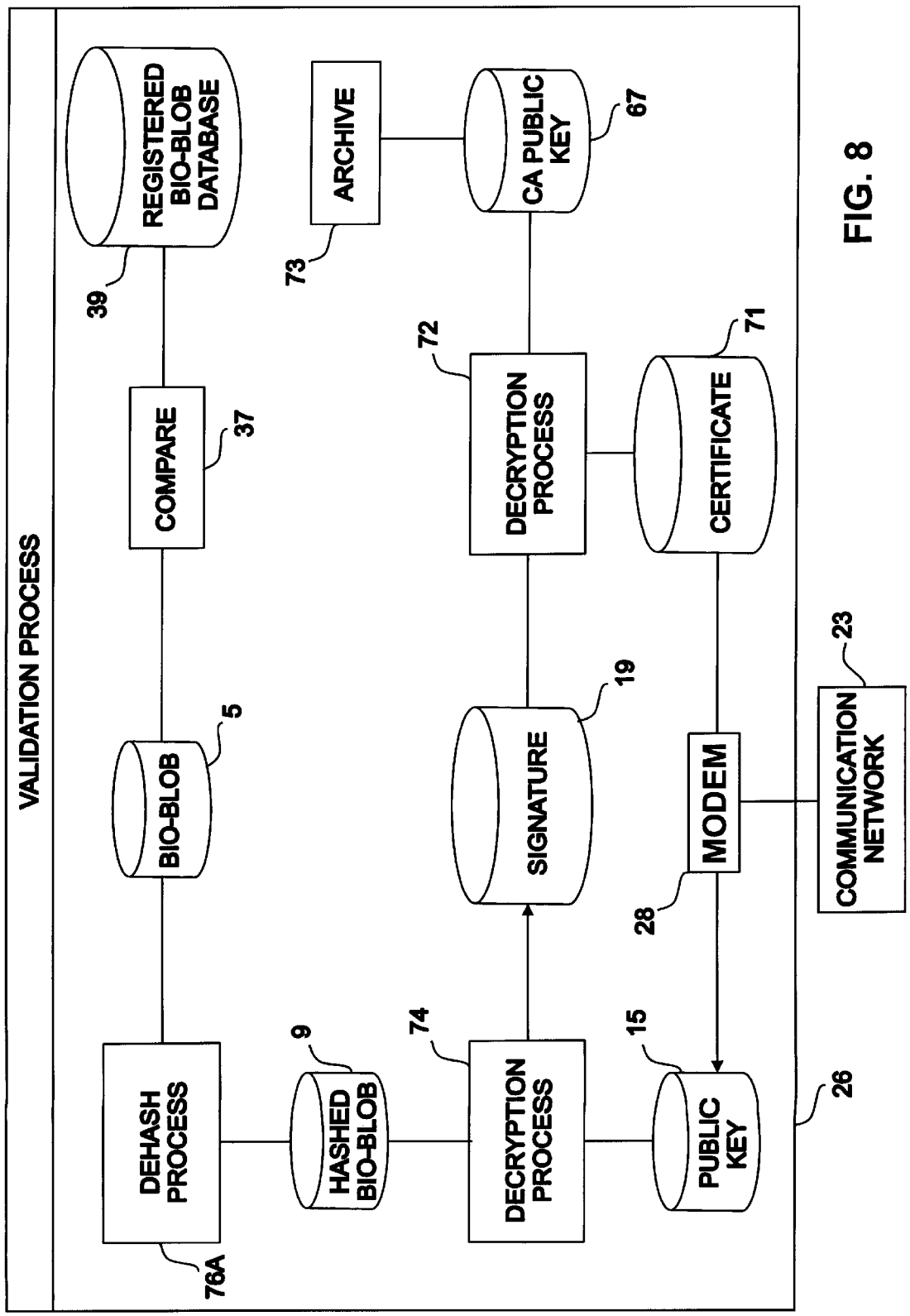
FIG. 8 is a block diagram showing a validation process according to the second embodiment.

FIGS. 6, 7, and 8 show an apparatus for sending signed electronic messages via the communication network 23 according to a second embodiment of the present invention. FIG. 6 shows the process of sending a message from the registrant's terminal 1 using the certificate 71. A transaction message 75 is formed including, for example, a contract the user wishes to execute with the operator of the receiving terminal 83. The encryption process 77 joins the transaction message 75 with the certificate 71 and encrypts the result using the registrant's private key 13 to form the signed message 79. The signed message 79 is transmitted by the modem 80 and sent via the communication network 23 to a receiving terminal 83.

FIG. 7 shows the authentication of the signed message 79 by the receiving terminal 83. The signed message 79 is received by the modem 76 and is decrypted by the decryption process 85 using the registrant's public key 15 thereby recovering the transaction message 75 and the certificate 71. An authentication process 87 inspects the identity information 70 which is part of the certificate 71. The authentication process 87 accesses the public directory 4 via the communication network 23 to verify that the certificate 71 is valid. According to a preferred embodiment an active link to the public directory 4 embedded in the identity information 70 simplifies this process. For transactions where there is little risk that a message is fraudulent, simply verifying that the sender has a valid certificate 71 from a reputable certificate authority 25 is sufficient to proceed with the transaction.

An additional level of security can be obtained by recovering the bio-blob 5 from the certificate 71 and comparing it with the bio-blob 5 encrypted within the certificate 71 stored in the public directory 4. FIG. 8 shows a validation process 26 performed by the certificate authority 25. The certificate authority public key 67 is retrieved from the certificate archive 73 and is used by the decryption process 72 to decrypt the certificate 71 to extract the digital signature 19. The registrant's public key 15 is then used by the decryption process 74 to decrypt the signature 19 to extract the hashed bio-blob 9. The hashed bio-blob 9 is dehashed by the dehash process 76A to extract the bio-blob 5. The compare function 37 retrieves the bio-blob 5 that was stored in the registered bio-blob database 39 during the registration process and compares it with the bio-blob 5 extracted from the certificate 71.

The identity of the person sending the message may be positively confirmed by comparing the bio-blob 5 extracted from the certificate 71 to an actual biological feature of the person alleged to have sent the message. For example, if the bio-blob 5 were a digital representation of a DNA marker plate prepared from the registrant's tissue, then a similar marker plate could be prepared from tissue taken from the alleged sender's body. If the bio-blob 5 matches the alleged sender's marker plate then it is virtually certain that the sender is the registrant.

Figure 9:
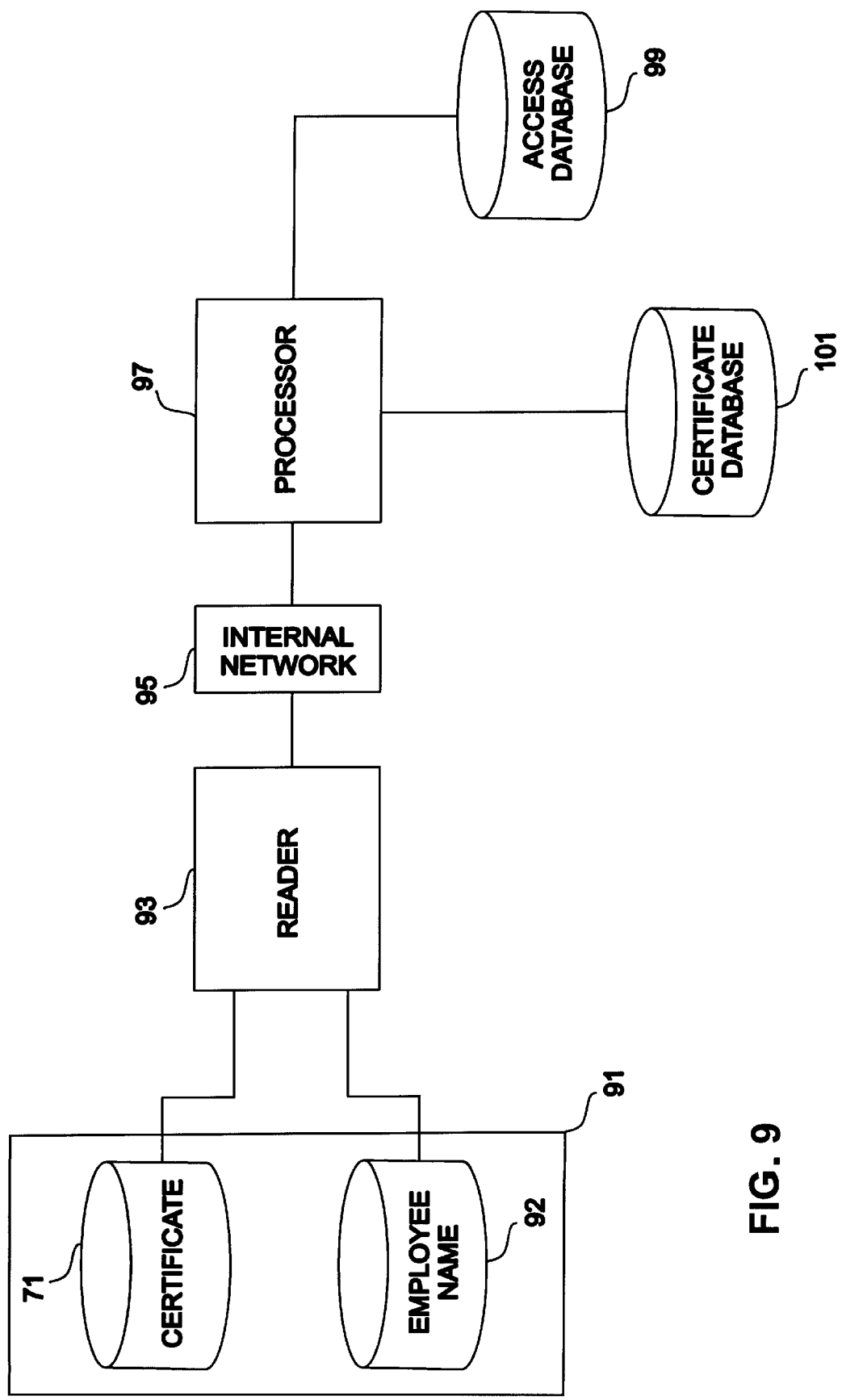
FIG. 9 is a block diagram showing a digital key entry system according to a third embodiment of the present invention.

The digital certificate 71 described above may be used to authenticate electronic document 75 transmitted between remote parties via a communication network 23. However, the invention is not limited to this type of communication. The digital certificate 71 according to the present invention is applicable to any type of digital message where non-repudiation and positive identification are required. FIG. 9 illustrates a third embodiment of the present invention where the digital certificate 71, formed according to the first embodiment, is incorporated into a key access card 91 to be used, for example, by an employee to gain access to a restricted area of an employer's building. The digital certificate 71 is stored in a memory on the card 91 along with conventional identifying information such as the employee's name 92. The memory may be a solid-state device, a magnetic strip, a pattern of marks or another known technique for storing digital data. The registrant, for example, an employee seeking access to a restricted area, presents the card 91 to a card reader 93. The reader 93 retrieves the certificate 71 and name 92 from the card 91 and communicates them to a processor 97 via an internal network 95. The processor 97 compares the certificate 71 with a database of valid certificates 101 and if a match is found, the employee is allowed access. The employee name 92 and certificate 71 are stored in an access database 99 by the processor 97. Routine reports of access activity can be generated based on the employee name 92 alone. If positive proof that a particular employee entered the restricted area, for example where a crime has been committed, the digital certificate 71 can be retrieved from the access database 99 and the bio-blob 5 encoded therein can be compared with the biological indicia of the employee.

The above embodiments are illustrative of the present invention. While these are presently considered the most practical and preferred embodiments, it is to be understood that the invention is not limited by this disclosure. This invention is intended to cover various modifications and equivalent arrangements included within the spirit and scope of the invention, as will be apparent to a person of ordinary skill in the art.

We claim:

1. A data card comprising:

a memory;

a reader connected to the memory;

information stored in the memory identifying a registrant;

a digital certificate stored in the memory, wherein the digital certificate includes a digitized biological indicium, the biological indicium uniquely identifying the registrant;

a certificate database containing a verified copy of the digital certificate;

an access database; and a processor connected to the reader, the certificate database and the access database, wherein the processor commands the reader to read the digital certificate and the identifying information from the memory, compares the digital certificate from the memory with the verified copy in the certificate database and stores the identifying information in the access database.

2. A method for forming a certificate for authentication of electronic messages, the method comprising:

providing a digital representation of a biological indicium of a registrant;

forming a first encrypting key according to a public key algorithm;

encrypting the digitized representation using the first encrypting key to form a digital signature;

transmitting the digital signature to a certificate authority;

forming a second encrypting key according to the public key algorithm; and encrypting the signature using the second encrypting key by the certificate authority to form the certificate.

3. The method according to claim 2 further comprising providing a workstation in the custody of the registrant and performing at least one of the first encrypting step and the second encrypting step at the workstation.

4. A method for forming a certificate for authentication of electronic messages, the method comprising:

entering information identifying a registrant;

providing a digital representation of a biological indicium of the registrant;

first encrypting the digital representation to form a digital signature;

appending the identifying information to the digital signature;

transmitting the digital signature to a certificate authority;

verifying the entered identifying information at a remote registration terminal to generate verification information;

transmitting the verification information from the remote registration terminal to the certificate authority; and second encrypting the digital signature by the certificate authority to form the certificate.

5. A method of authenticating an electronic document, the method comprising:

providing a digitized biological indicium of a registrant;

first encrypting the digitized biological indicium to form a digital signature;

storing the digitized biological indicium on a storage medium;

transmitting the digital signature to a certificate authority from a registrant terminal;

decrypting the digital signature to extract the digitized biological indicium;

registering the registrant by entering identifying information provided by the registrant into a registration terminal;

retrieving the digitized biological indicia from the storage medium by the registration terminal;

transmitting the identifying information and the digitized biological indicium to the certificate authority from the registration terminal;

comparing the transmitted digitized biological indicium with the digitized biological indicium extracted by the certificate authority;

second encrypting the digital signature to form a certificate;

storing the certificate in a registry;

appending the certificate to the electronic document to form a signed document;

transmitting the signed document to a receiving terminal by an electronic transmission means;

extracting the certificate from the transmitted signed document; and comparing the extracted certificate with the certificate stored in the registry.

6. A method of authenticating an electronic document, the method comprising:

providing a digitized biological indicium of a registrant;

first encrypting the digitized biological indicium to form a digital signature;

authenticating the digital signature;

generating a second private encrypting key and second public decrypting key by a certificate authority;

encrypting the digital signature using the second private encrypting key to form a certificate;

storing the second public decrypting key in a registry;

appending the certificate to the electronic document to form a signed document;

transmitting the signed document to a receiving terminal by an electronic transmission means;

extracting the certificate from the transmitted signed document; and comparing the extracted certificate with the certificate stored in the registry.

7. The method according to claim 6 further comprising:

retrieving the second public decrypting key from the registry;

decrypting the certificate using the second public decrypting key to obtain the digital signature;

decrypting the digital signature using the first public decrypting key to extract the digitized representation; and comparing the extracted digitized representation with the biological indicium of the registrant.

8. An apparatus for forming a certificate comprising:

a storage medium containing a digital representation of a biological indicium of a registrant;

a terminal including:

input means for reading the storage medium and for inputting the digital representation;

first encrypting means for encrypting the digitized representation to form a digital signature; and transmitting means for transmitting the digital signature; and a certificate authority, the certificate authority including:

receiving means for receiving the transmitted digital signature;

decrypting means for decrypting the digital signature to extract the digital representation;

authenticating means for verifying that the biological indicium represented by the digital representation corresponds to the registrant; and second encrypting means for encrypting the digital signature to form the certificate.

9. The apparatus according to claim 8 wherein the terminal includes hashing means for hashing the digital representation.

10. The apparatus according to claim 8 wherein the transmitting means includes a communication network.

11. The apparatus according to claim 10 wherein the authenticating means includes a remote registration terminal connected with the certificate authority via the communication network.

12. The apparatus according to claim 11 wherein the remote registration terminal includes a reader for reading the digital representation from the storage medium and input means for inputting information identifying the registrant.

13. An apparatus for forming a certificate comprising:

a communication network;

a memory containing a digital representation of a biological indicium of a registrant;

a terminal including:
- a reader responsive to the memory to capture the digital representation;
- a first encrypting processor connected with the reader; and
- a first modem connected with the first encrypting processor, wherein the first encrypting processor encrypts the digital representation retrieved from the memory to form a digital signature and causes the first modem to transmit the digital signature via the communication network; and a certificate authority, the certificate authority including:
- a second modem connected with the communication network, wherein the second modem receives the digital signature from the communication network;
- a decrypting processor connected with the second modem, wherein the decrypting processor receives the digital signature from the second modem and decrypts the digital signature to recover the digital representation;
- a comparator connected to the decrypting processor, wherein the comparator receives the digital representation from the decrypting processor and compares the digital representation with a verified digital signature and, if a match is found between the digital signature and the verified digital signature, the comparator generates an authenticated signal; and
- a second encrypting processor connected with the comparator and responsive to the authenticated signal, wherein, in response to the authenticated signal, the second encrypting processor encrypts the digital signature thereby forming a digital certificate.

\* \* \* \* \*